C. A. NETHERCUTT.
TIRE GUARD.
APPLICATION FILED AUG. 17, 1917.
1,312,344.
Patented Aug. 5, 1919.
2 SHEETS—SHEET 1.
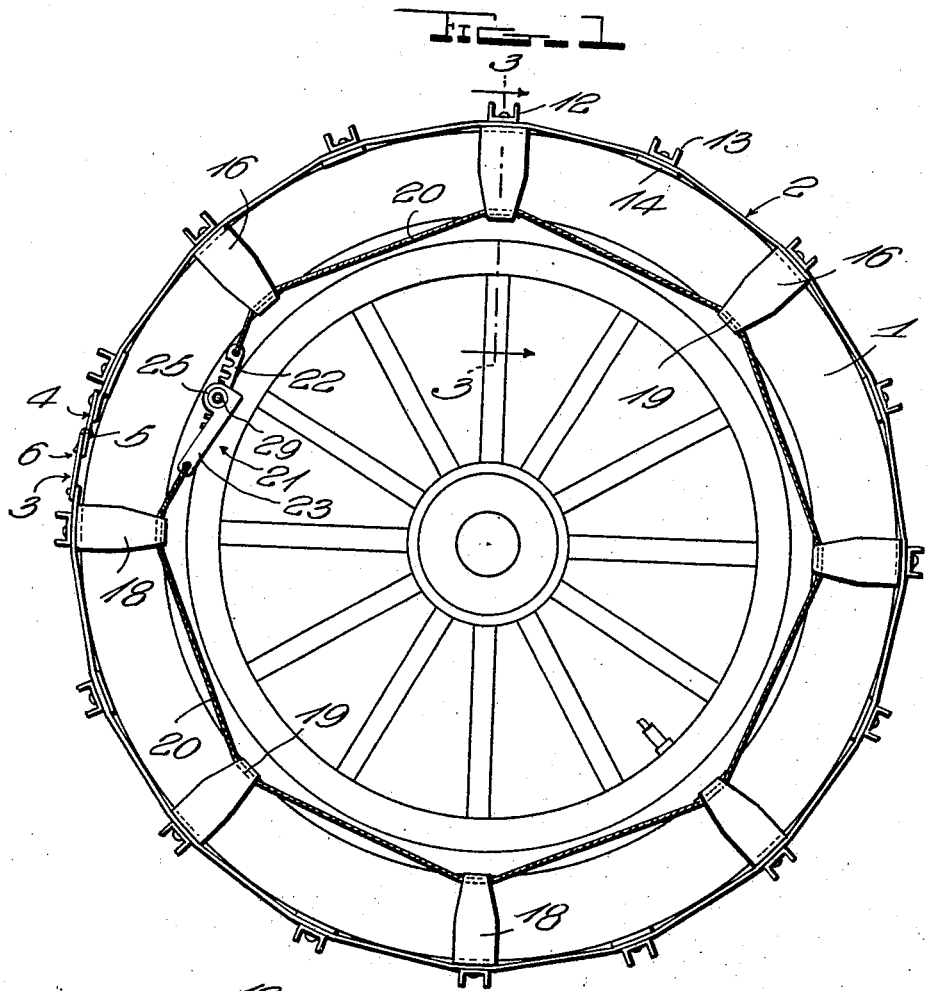
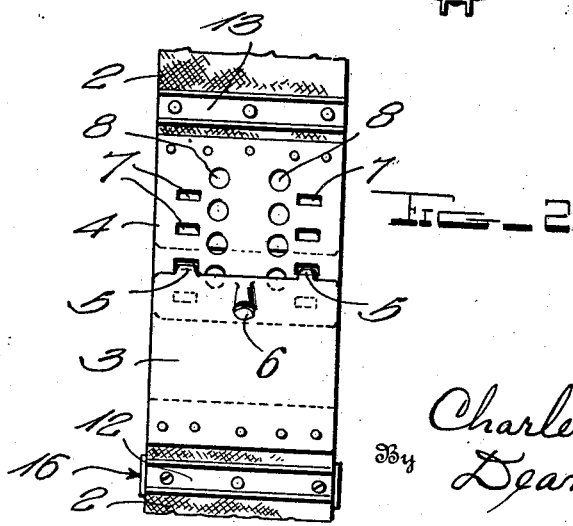
Inventor
Charles A. Nethercutt,
By Deane & Custer
his Attorneys C. A. NETHERCUTT.
TIRE GUARD.
APPLICATION FILED AUG. 17, 1917.
1,312,344.
Patented Aug. 5, 1919.
2 SHEETS—SHEET 2.
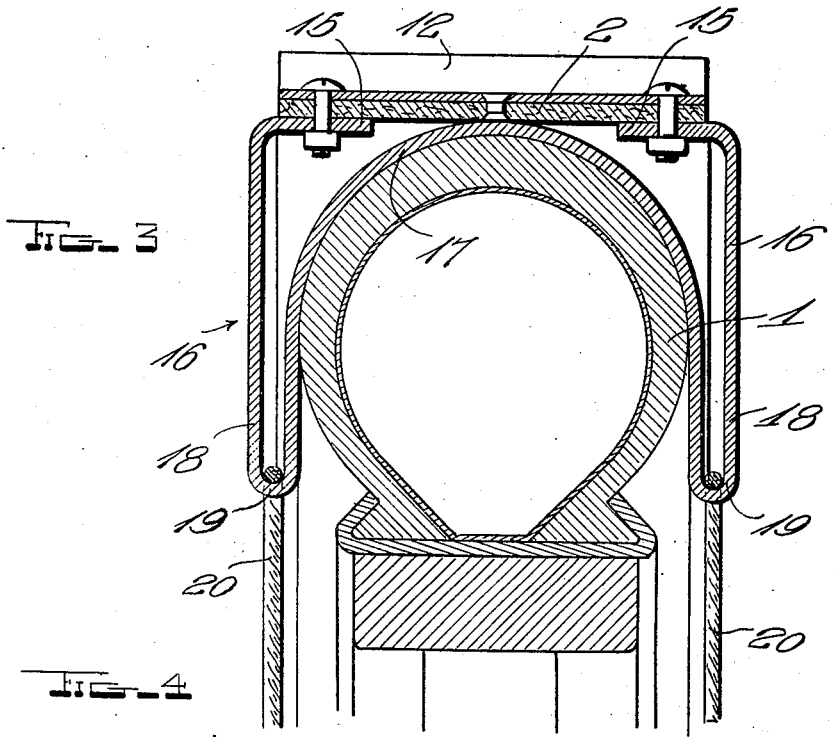
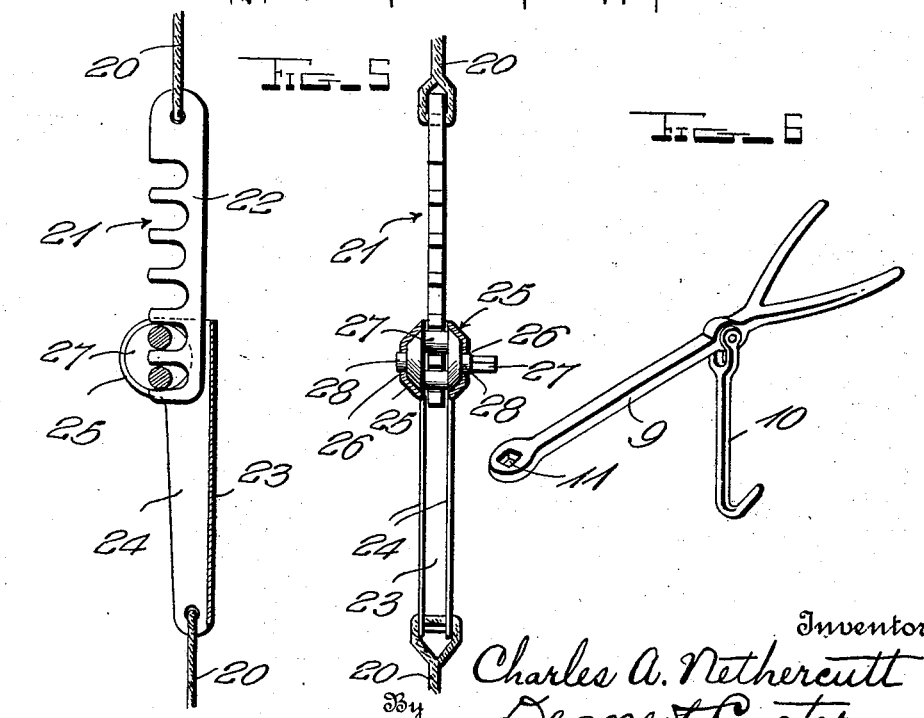
Inventor
Charles A. Nethercutt
By Deane & Cuter
his Attorneys

UNITED STATES PATENT OFFICE.

CHARLES A. NETHERCUTT, OF BURNETTS CREEK, INDIANA.

TIRE-GUARD.

1,312,344.  Specification of Letters Patent.  Patented Aug. 5, 1919.

Application filed August 17, 1917. Serial No. 186,782.

*To all whom it may concern:*

Be it known that I, CHARLES A. NETHERCUTT, a citizen of the United States, residing at Burnetts Creek, in the county of White and State of Indiana, have invented certain new and useful Improvements in Tire-Guards, of which the following is a specification.

This my present invention has to do with guards for the tires of autombiles and analogous wheels.

The general object of my invention is the provision of a tire guard readily applicable to an ordinary automobile wheel without previous preparation or alteration thereof, and one that is efficient in protecting the tire against puncture and other injury and is also constructed and arranged to positively engage the surface traveled over, with a view to increasing the tractive capacity of the wheel and, at the same time, precluding skidding thereof.

A secondary object of the invention is the provision of improved means for securing the guard on a wheel and over the tire thereof.

A further object is the provision of an improved mechanical combination for use in drawing the ends of a securing cable toward each other and maintaining the cable in a taut state without liability of casual loosening thereof.

Other objects and advantageous features of the invention will be fully understood from the following detailed description and claim when the same are read in connection with the drawings, accompanying and forming part of this specification, in which:

Figure 1 is a side elevation showing a wheel equipped with my novel guard.

Fig. 2 is a detail plan view showing the mode of connecting the end portions of the guard.

Fig. 3 is an enlarged detail transverse section showing the guard as properly arranged relative to a wheel and the tire thereof.

Fig. 4 is a longitudinal section of one of the cable fasteners of my invention.

Fig. 5 is a section of the same taken at a right angle to Fig. 4.

Fig. 6 is a perspective of the tool employed in the application of the guard.

Similar numerals of reference designate corresponding parts in all of the views of the drawings.

The wheel shown is equipped with the usual pneumatic tire 1, but I would have it here understood that while designed especially for use on a pneumatic tire to protect the same against puncture, cutting, splitting and the like, my novel guard because of its tractive and non-skidding capabilities may be used to advantage on solid, cushioned and other tires.

The major portion of the guard is formed by a band 2, preferably of machine belting, designed to extend around and be opposed to the tread portion of the tire and to have its ends detachably connected so that the guard may be expeditiously and easily removed when it is desired to apply it to another wheel for repeated use. For effecting the said detachable connection I employ two metallic plates 3 and 4 riveted or otherwise permanently connected to the end portions of the flexible band; the plate 3 being provided with hooks 5 and an aperture 6, and the plate 4 having hook-receiving slots 7, in series, and apertures 8, also in series. The apertures 6 and 8 are for coöperation with a special tool that is preferably employed to draw the band 2 closed around the wheel tire; the said tool comprising a fork-shaped lever body 9 the ends of the tangs of which are disposed in appropriate apertures 8, and a tongue 10 pivoted to said lever body and adapted to be hooked into the aperture 6. When said tool is properly applied and manipulated, the plate 3 is drawn over the plate 4 in lapped relation so that the hooks 5 may be engaged in the proper slots 7 to connect the band ends in such manner that casual disconnection is impossible. For the sake of convenience an angular wrench aperture 11 is provided in the lever body 9 adjacent to the handle end thereof, for a purpose hereinafter set forth.

On its outer side at intervals in its length the band 2 is equipped with transverse metallic cleats 12 and 13 which are preferably, though not necessarily, of channel form, and are adapted to positively engage sand, ice, mud, clay, snow and the like, so as to prevent skidding or slipping, and at the same time, by increasing the tractive capacity of the wheel enable the automobile to extricate itself from bad places in a roadway. The cleats 13 are connected by rivets or the like to the band 2 and metallic plates 14 arranged against the inner side of the band. The cleats 12, however, are connected by bolts or other suitable means to the band 2 and to the transversely-disposed terminal portions 15 of metallic saddles 16. The said saddles 16 are identical in construction and therefore a detailed description of the one shown in Fig. 3 will suffice to impart a definite understanding of the eight that are preferably employed in combination with the single band. By reference to said Fig. 3 it will be noted that the saddle is formed in one piece and comprises an intermediate portion 17 curved in conformity to and adapted to rest snugly over the tire 1, and side arms 18 joined through bights 19 with the ends of the curvilinear portion and connecting said ends with the terminal portions 15. When applied as stated the saddles 16 will manifestly hold the band 2 in a strong manner on the tire 1 and against displacement as well as against relative lateral movement, with the result that the non-skidding efficiency of my guard is materially increased.

For the purpose of holding the guard on the wheel and the guard band 2 snug against the tread of the tire 1, I provide cables 20, one at each side of the wheel, and appliances 21, of which there is one to each cable, for taking up slack of the cables and retaining the same in a taut state without liability of accidental loosening or release. The cables 20 are respectively formed, by preference, of a single piece of wire and each is seated in the bights 19 of the saddles 16, at one side of the wheel. At its ends each cable 20 is connected to the outer ends of the members of one appliance 21, and it will be readily observed that each appliance 21 is made up of a member 22 having notches or seats in one of its edges at intervals of its length, a member 23 having spaced bars 24 adapted to receive the member 22 between them and also having enlargements 25 on the bars and in which are alined transverse apertures 26, and an apertured rotatable body 27 disposed between the enlargements 25 and having journals 28 disposed in the apertures 26; one of said journals having an extension 29, of angular form, in cross-section, for the application of the before described tool.

With the members of the appliances 21 relatively arranged as illustrated, it will be understood that rotation of the bodies 27 in one direction will move said bodies endwise inwardly on the notched members 22; the bodies 27 seating over the teeth and in the interdental spaces or notches of the members 22 in succession. It will also be noted that when the cables are taut the tension thereof will operate to retain the bodies 27 in their adjusted positions without liability of casual displacement or loosening. When, however, the bodies 27 are rotated in reverse direction to move them endwise-outwardly relative to the members 22, the cables 20 will be loosened, whereupon the members 23 with their rotatable bodies 27 may be lifted or moved laterally out of engagement with the members 22, and then after the plates 3 and 4 are disconnected, the guard, as a unit, may be readily removed from the wheel.

By reversing the operations just described the guard may be expeditiously and easily fastened on the tire and wheel, and when so fastened the taut cables 20 will obviously hold the saddles 16 tight against the tire 21 so that movement of the guard relative to the tire is effectually prevented.

Notwithstanding the practical advantages of my novel guard as set forth herein, it will be observed that the guard is inexpensive in construction, is well adapted to withstand the rough usage to which automobile-wheel appurtenances are ordinarily subjected, and is susceptible of ready application and removal without entailing the employment of skilled labor.

The construction illustrated and specifically described herein constitutes the best practical embodiment of my invention of which I am cognizant. It is to be understood, however, that I do not confine myself to the described specific construction and relative arrangement of elements and their features inasmuch as in the practice of invention changes in the form and arrangement of parts may be made without involving departure from the scope of my appended claim.

Having described my invention, what I claim and desire to secure by Letters Patent, is:

A tire guard comprising a band, means for connecting the band, saddles arranged transversely and in spaced relation at the inner side of the band and each formed of a single piece of metal and including an intermediate curvilinear portion that straddles and snugly fits the cross-section of a tire and terminates in inwardly-extending inner side arms, outer side arms opposite to and spaced from said inner side arms, transverse bights joining the inner ends of said inner and outer side arms, and transverse, inwardly-directed terminal portions at the outer ends of said outer side arms, connected to the band; the curvilinear intermediate portion and the inner and outer side arms forming loops that are adapted to rest parallel to and at opposite sides of a tire and are open at their comparatively large outer ends and cables seated in the bights of said
5 loops and having their ends detachably connected together.

In testimony whereof I affix my signature in presence of two witnesses.

CHARLES A. NETHERCUTT.

Witnesses:
   E. M. KOONSMAN,
   T. L. BABCOCK.

Copies of this patent may be obtained for five cents each, by addressing the "Commissioner of Patents. Washington, D. C."